United States Patent
Kitagawa

(10) Patent No.: US 10,257,402 B2
(45) Date of Patent: Apr. 9, 2019

(54) CONTROL APPARATUS, METHOD OF CONTROLLING IMAGE SENSING DEVICE, AND NON-TRANSITORY COMPUTER-READABLE STORAGE MEDIUM THAT CONTROLS AN IMAGE SENSING DEVICE FOR TRACKING AND SENSING A TRACKING TARGET

(71) Applicant: CANON KABUSHIKI KAISHA, Tokyo (JP)

(72) Inventor: Eiichiro Kitagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/229,147

(22) Filed: Aug. 5, 2016

(65) Prior Publication Data
US 2017/0064180 A1    Mar. 2, 2017

(30) Foreign Application Priority Data
Aug. 28, 2015    (JP) .................. 2015-169725

(51) Int. Cl.
*H04N 5/232*    (2006.01)
*G06T 7/254*    (2017.01)
(Continued)

(52) U.S. Cl.
CPC ..... *H04N 5/23203* (2013.01); *G06K 9/00771* (2013.01); *G06K 9/3233* (2013.01);
(Continued)

(58) Field of Classification Search
CPC ............ H04N 5/23203; H04N 5/23296; G06T 7/254; G06K 9/00771; G06K 9/3233
(Continued)

(56) References Cited

U.S. PATENT DOCUMENTS 8,634,000 B2 *  1/2014  Ishikawa ............ H04N 5/23296
                                                    348/240.3
9,992,421 B2     6/2018  Tsubusaki
                     (Continued)

FOREIGN PATENT DOCUMENTS

CN    102281398 A    12/2011
CN    102291569 A    12/2011
                    (Continued)

OTHER PUBLICATIONS

Communication including Extended European Search Report dated Dec. 20, 2016, issued in corresponding European Patent Application No. 15183305.8-1905.
(Continued)

*Primary Examiner* — Albert H Cutler
(74) *Attorney, Agent, or Firm* — Venable LLP

(57) ABSTRACT

A control apparatus includes at least one processor operatively coupled to a memory, serving as a sensing unit configured to sense a tracking target that appears in a sensed video, a recording unit configured to record a size of the tracking target, and a search unit configured to obtain a predicted size of the tracking target in the sensed video, based on the size recorded by the recording unit, for a case of zooming out at a predetermined scaling factor, and, if the predicted size is larger than a predetermined size, to zoom out by the predetermined scaling factor, and then to search for the tracking target in the sensed video after the zoom out.

18 Claims, 9 Drawing Sheets

(51) Int. Cl.
*G06K 9/00* (2006.01)
*G06K 9/32* (2006.01)

(52) U.S. Cl.
CPC ......... *G06T 7/254* (2017.01); *H04N 5/23296* (2013.01); *G06K 2209/21* (2013.01)

(58) Field of Classification Search
USPC .......................... 348/240.99–240.3, 143–159
See application file for complete search history.

(56) References Cited

U.S. PATENT DOCUMENTS

| | | | |
|---|---|---|---|
| 2005/0174451 A1* | 8/2005 | Nozaki | H04N 5/232 348/240.99 |
| 2011/0069865 A1* | 3/2011 | Park | G06K 9/00771 382/103 |
| 2011/0149120 A1* | 6/2011 | Kubota | H04N 5/232 348/240.99 |
| 2011/0243538 A1* | 10/2011 | Morimoto | H04N 5/23219 396/77 |
| 2013/0120618 A1* | 5/2013 | Wang | H04N 5/23296 348/240.99 |
| 2014/0253785 A1 | 9/2014 | Chan et al. | |
| 2014/0267751 A1 | 9/2014 | Kitagawa | |
| 2014/0267834 A1* | 9/2014 | Aoki | H04N 5/23296 348/240.1 |
| 2015/0146011 A1 | 5/2015 | Tsubusaki | |

FOREIGN PATENT DOCUMENTS

| | | |
|---|---|---|
| CN | 102404506 A | 4/2012 |
| CN | 104038691 A | 9/2014 |
| CN | 104683689 A | 6/2015 |
| GB | 2 411 229 A | 8/2005 |
| JP | H03-026180 A | 2/1991 |
| JP | H07-030795 A | 1/1995 |

OTHER PUBLICATIONS

Yin, Zhaozheng, et al., "Object Tracking and Detection after Occlusion via Numerical Hybrid Local and Global Mode-seeking", IEEE Conference on Computer Vision and Pattern Recognition, Aug. 5, 2008, Anchorage, Alaska.

Lee, Jehoon, et al., "Object Tracking and Target Reacquisition Based on 3-D Range Data for Moving Vehicles", IEEE Transactions on Image Processing, vol. 20, Issue 10, pp. 2912-2924, Oct. 2011.

Loza, Artur, et al., "Structural similarity-based object tracking in mulimodality surveillance videos", Machine Vision and Applications, pp. 71-83, 2009.

Search Report dated Nov. 12, 2018, issued in corresponding European Patent Application No. 18181169.6.

Office Action dated Nov. 28, 2018, issued in corresponding Chinese Patent Application No. 201610715088.4.

* cited by examiner

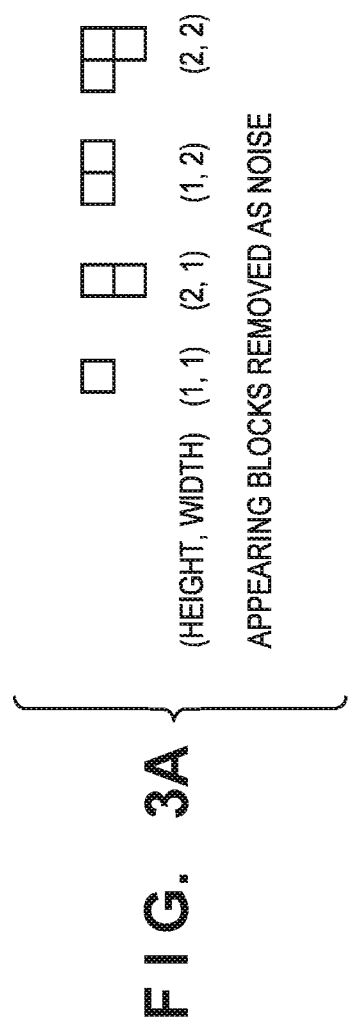
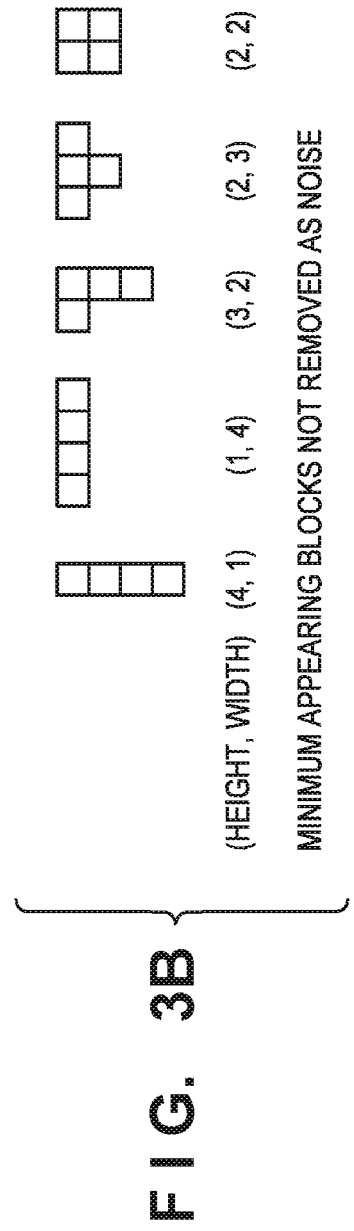

F I G. 6
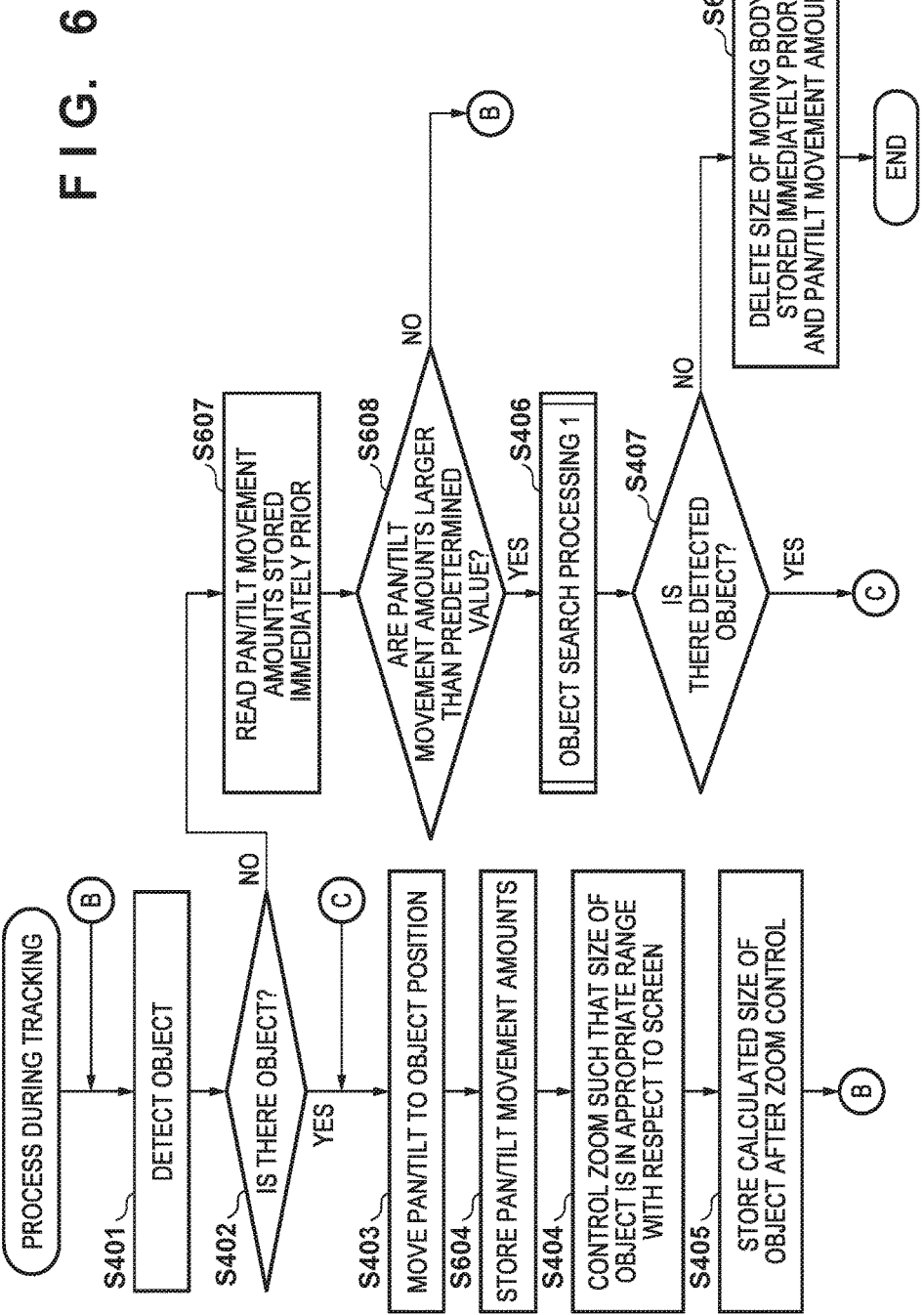

CONTROL APPARATUS, METHOD OF CONTROLLING IMAGE SENSING DEVICE, AND NON-TRANSITORY COMPUTER-READABLE STORAGE MEDIUM THAT CONTROLS AN IMAGE SENSING DEVICE FOR TRACKING AND SENSING A TRACKING TARGET

CLAIM OF PRIORITY

This application claims the benefit of Japanese Patent Application No. 2015-169725, filed Aug. 28, 2015, which is hereby incorporated by reference herein in its entirety.

BACKGROUND OF THE INVENTION

Field of the Invention

The present invention relates to a technique for controlling an image sensing device that tracks and senses a tracking target.

Description of the Related Art

In monitoring cameras, for which pan/tilt control is possible, a moving-object detection function is installed, and monitoring cameras having an automatic tracking function for controlling pan/tilt to continue to capture a moving body detected in an imaging screen near the center of the screen, have been devised.

In Japanese Patent Laid-Open No. H3-26180, a technique is disclosed in which in an automatic tracking apparatus, if the size at which an object being tracked is displayed on a screen is small, it is displayed to be larger on the screen by controlling a zoom in a telescopic direction. Also, in Japanese Patent Laid-Open No. H3-26180, a zoom control method is disclosed in which, when an object is lost from view, the object is searched for by controlling a zoom to a wide angle side.

In Japanese Patent Laid-Open No. H7-30795, a method of causing a zoom operation on a lens unit in a wide direction when an object is lost from view, a method of predicting a position of the object and performing pan/tilt control for a predicted position, and a method of a scan operation are disclosed.

However, when an object is searched for by controlling a zoom to a wide angle side when the object, which is being tracked, is lost from view as in the conventional technique, there are cases in which the object size on the screen becomes too small, and it becomes impossible to detect the object.

Also, in a method of predicting a position of an object, the existence or absence of tracking depends on the precision of the prediction, and there are cases in which tracking cannot be performed when the prediction is incorrect. Also, in a method of scanning by widening a range, in which a camera can sense by controlling pan/tilt, a new dead space occurs in a direction opposite to the direction of the pan/tilt movement due to the control of the pan/tilt. With this, there will be an increased possibility of a problem that an object present there will cease to be discoverable, and that a different moving body to the moving body that was being tracked will be discovered and tracked due to scanning a separated position.

SUMMARY OF THE INVENTION

The present invention was conceived in view of these kinds of problems, and provides a technique for reducing a problem of not being able to detect a tracking target and ceasing to able to track it due to the size of the tracking target on a sensed video becoming too small.

According to a first aspect, the present invention provides a control apparatus that controls an image sensing device for tracking and sensing a tracking target, the apparatus comprising a recording unit configured to record a size of a tracking target that appears in a sensed video that is sensed by the image sensing device, and a search unit configured, when from a state in which the tracking target can be detected from the sensed video, a state in which the tracking target cannot be detected is entered, to obtain a predicted size of the tracking target in the sensed video based on the size recorded by the recording unit for a case of zooming out at a predetermined scaling factor, and if the predicted size is larger than a predetermined size, to zoom out by the predetermined scaling factor, and then search for the tracking target in the sensed video after the zoom out.

According to a second aspect, the present invention provides a method of controlling an image sensing device for tracking and sensing a tracking target, the method comprising recording a size of a tracking target that appears in a sensed video that is sensed by the image sensing device, when, from a state in which the tracking target can be detected from the sensed video, a state in which the tracking target cannot be detected is entered, obtaining a predicted size of the tracking target in the sensed video based on the recorded size for a case of zooming out at a predetermined scaling factor, and if the predicted size is larger than a predetermined size, zooming out by the predetermined scaling factor, and then searching for the tracking target in the sensed video after the zoom out.

Further features of the present invention will become apparent from the following description of exemplary embodiments (with reference to the attached drawings).

BRIEF DESCRIPTION OF THE DRAWINGS

FIGS. 3A and 3B are views for explaining a detectable size.

FIG. 6 is a flowchart of a tracking image sensing operation on tracking target by the image sensing device.

DESCRIPTION OF THE EMBODIMENTS

Embodiments of the present invention will be described hereafter, in detail, with reference to the accompanying drawings. Note that embodiments described below merely illustrate examples of specifically implementing the present invention, and are only specific embodiments of a configuration defined in the scope of the claims. As an example, an example having a control apparatus within an image sensing device is described, but the control apparatus may be arranged externally to the image sensing device.

First Embodiment

In the present embodiment, an example of an image sensing device characterized as having the following configuration is described for an image sensing device that tracks and senses a tracking target. This image sensing device records a size of a tracking target that appears within a sensed video. Then, this image sensing device, in a case when it cannot detect the tracking target from the sensed video, obtains a predicted size of the tracking target in the sensed video after a zoom out by predetermined scaling factor based on the aforementioned size. Then, the image sensing device zooms out by the predetermined scaling factor if the predicted size is larger than the predetermined size, and after zooming out, searches for the tracking target in the sensed video. Thereafter, the searched out tracking target is tracked and sensed.

Figure 1:
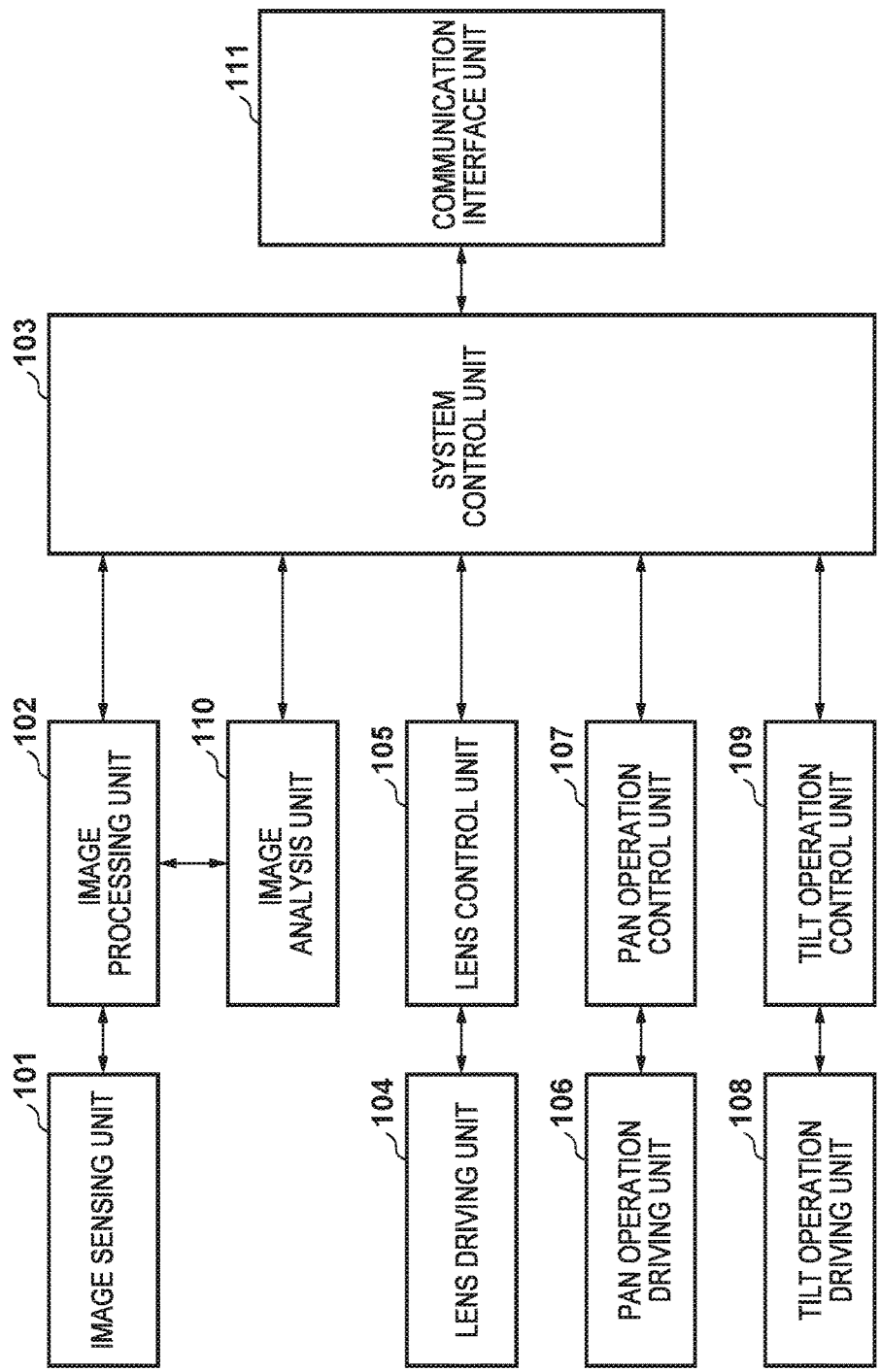
FIG. 1 is a block diagram for illustrating an example configuration of an image sensing device.

First, an example configuration of an image sensing device having a control apparatus according to embodiments is explained using the block diagram of FIG. 1. Note that the configuration illustrated in FIG. 1 is merely an example of a configuration that can realize operation of the image sensing device explained below, and limitation is not made to the configuration illustrated in FIG. 1. Also, the configuration illustrated in FIG. 1 merely illustrates main configurations for realizing operation of the image sensing device explained below, and, for example, configurations that are not key to the explanation below such as a configuration according to a power supply system and a configuration according to a user interface are omitted from the figure. Note that a function as a control apparatus is realized by a system control unit 103 and an image analysis unit 110, as an example.

An image sensing unit 101 is provided for converting external world light into a video signal by a photoelectric conversion, and the video signal is outputted to an image processing unit 102 of a subsequent stage. It is possible to use a CMOS image sensor (Complementary Metal Oxide Semiconductor Image Sensor), for example, as an image sensor for performing a photoelectric conversion. Also, a CCD image sensor (Charge Coupled Device Image Sensor) may be used as an image sensor.

The image processing unit 102 generates a sensed video by applying various known image processing to the video signal outputted from the image sensing unit 101. For example, the image processing unit 102 digitizes a video signal, converting it into video data (sensed video) that can be reproduced on another apparatus. It is possible for the image processing unit 102 to employ video data of various known formats, such as MPEG2, to convert the video signal into the video data. Also, the image processing unit 102 may encode the sensed video as appropriate.

The image analysis unit 110, using a known pattern matching technique or the like, performs processing for detecting a specific object that becomes a tracking target from the sensed video generated by the image processing unit 102. For example, a person is detected as the specific object. A configuration may be taken such that the image analysis unit 110 detects a specific person registered as a tracking target. Also, a configuration may be taken such that the image analysis unit 110 detects an object that simply moves (a moving body) as the specific object.

A lens driving unit 104 is configured by a zoom lens and a focus lens driving system, corresponding driving source motors, and the like. An operation control of the lens driving unit 104 is performed by a lens control unit 105. The lens control unit 105 performs an operation control of the lens driving unit 104 in accordance with an instruction from the system control unit 103.

Figure 10A:
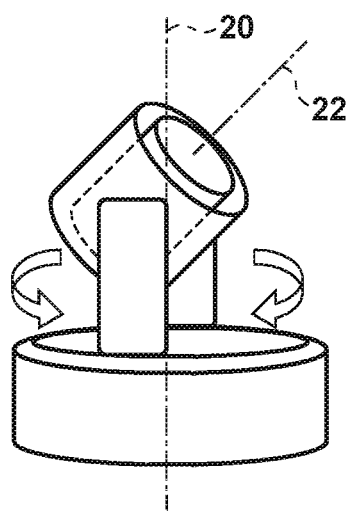
FIGS. 10A and 10B are views for illustrating an outer appearance of the image sensing device.
Figure 10B:
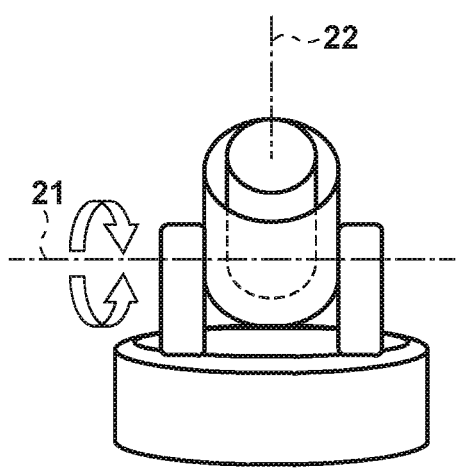

A pan operation driving unit 106 is configured by a mechanical driving system for performing a pan operation of the image sensing device, and a driving source motor, and the like, and as an example, as illustrated in FIGS. 10A and 10B, it is possible to cause an image sensing direction (an optical axis of an image sensing lens) 22 to rotate 360 degrees in a pan direction. In other words, it is possible to cause the image sensing direction 22 of the image sensing device to rotate with a predetermined pan axis 20 as the axis of rotation. Operation control of the pan operation driving unit 106 is performed by a pan operation control unit 107. The pan operation control unit 107 performs operation control of the pan operation driving unit 106 in accordance with an instruction from the system control unit 103.

A tilt operation driving unit 108 is configured by a mechanical driving system for performing a tilt operation of the image sensing device, and a driving source motor, and the like, and as an example, as illustrated in FIGS. 10A and 10B, it is possible to cause the image sensing direction 22 to rotate around a tilt axis 21, which is perpendicular to the pan axis 20. In other words, it is possible to cause the image sensing direction 22 to rotate one hundred eighty degrees from a direction perpendicular to the pan axis 20. An operation control of the tilt operation driving unit 108 is performed by a tilt operation control unit 109. The tilt operation control unit 109 performs an operation control of the tilt operation driving unit 108 in accordance with an instruction from the system control unit 103.

The system control unit 103 has a processor (for example, a CPU or a DSP) and a memory (for example, a RAM), and, by the processor executing processing using a computer program and data stored in the memory, operation control of each unit configuring the image sensing device is performed. With this, as a result, the system control unit 103 executes or controls each process described later as being something that the image sensing device performs. For example, the system control unit 103 makes an instruction for an image quality adjustment to the image processing unit 102, and makes instructions for zoom and focus control to the lens control unit 105. Also, the system control unit 103 makes respective instructions for a pan operation and a tilt operation to the pan operation control unit 107 and the tilt operation control unit 109.

A communication interface unit 111 performs data communication with external devices. For example, the communication interface unit 111 transmits a sensed video generated by the image processing unit 102 to an external device, and receives image sensing parameters such as for pan, tilt, and zoom of the image sensing device, and setting data of the image sensing device that are transmitted from an external device.

By virtue of the configuration of FIG. 1, the image analysis unit 110 can reference the sensed video of each frame generated by the image processing unit 102, and detect a moving body in a frame by obtaining a difference in the video between two adjacent frames. Of course, the method of detecting the moving body in the frames may be a method other than this. The system control unit 103, based on the position in the frames of the moving body that the image analysis unit 110 detects, obtains a change amount for a pan angle, a tilt angle, and a zoom so that the moving body appears at a stipulated size in a center position of a frame. Note that it is not necessary to continuously obtain the change amount for all of the pan angle, the tilt angle, and the zoom, and there are cases in which the change amount for only one of these is obtained, or the change amount for only two of these is obtained depending on the situation.

The system control unit 103, if a change amount of the pan angle is obtained, instructs the pan operation control unit 107 so as to change the pan angle of the image sensing device by the obtained pan angle change amount. Also, the system control unit 103, if a change amount (movement amount) of the tilt angle is obtained, instructs the tilt operation control unit 109 so as to change the tilt angle of the image sensing device by the obtained tilt angle change amount. Also, the system control unit 103, if a change amount of the zoom is obtained, instructs the lens control unit 105 so as to change the zoom of the image sensing device by the obtained zoom change amount. With this, the image sensing device can track and sense the tracking target.

However, there are cases in which, during a change in the pan angle or the tilt angle of the image sensing device, the tracking target is lost from view due to the movement of the tracking target (the image analysis unit 110 cannot detect the tracking target from the sensed video). Regarding reasons that such cases occur, an explanation is given using FIGS. 2A-2C from the relationship between the object position in the sensed video and the pan/tilt movement amount.

Note that, in the explanation below, explanation is given with a horizontal direction as a reference, but it is possible to assume a different reference as appropriate in accordance with the orientation in which the image sensing device is installed. In the following explanation, as an example, an explanation is given assuming that the image sensing device is attached to a ceiling such that the pan axis 20 is in a vertical direction. That is, it is assumed that the image sensing device senses in a downward direction from the ceiling. Also, in FIGS. 2A, 2B, and 2C, a horizontal direction of the screen and the tilt axis 21 are parallel.

Figure 2A:
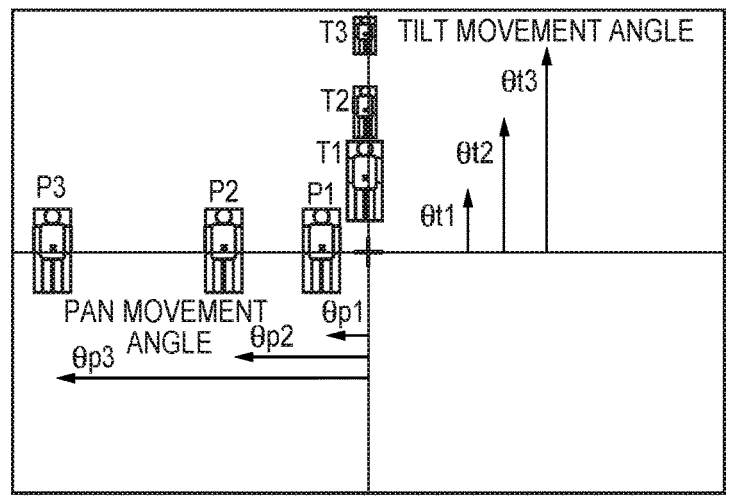
FIG. 2A through 2C are views for explaining reasons that a tracking target is lost from view.

FIG. 2A expresses a sensing range (sensed video) of the image sensing device in a case when the image sensing direction (direction of the optical axis of the image sensing lens) is close to the horizontal direction. The change amounts (the pan movement angle) of the pan angle for causing the objects P1, P2, and P3 in the sensed video to reach the center position of the frame are respectively $\theta p1$, $\theta p2$, and $\theta p3$ in the leftward direction (counterclockwise when viewed from the upward direction), and the tilt angle change amount (tilt movement angle) is approximately zero. Also, the pan movement angle in relation to the objects T1, T2, and T3 is zero, and the tilt movement angles are respectively $\theta t1$, $\theta t2$, and $\theta t3$ in the upward direction.

Figure 2B:
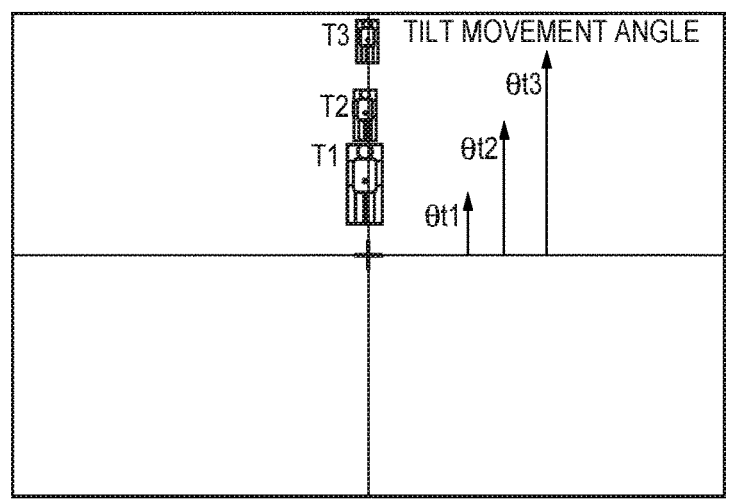
Figure 2C:
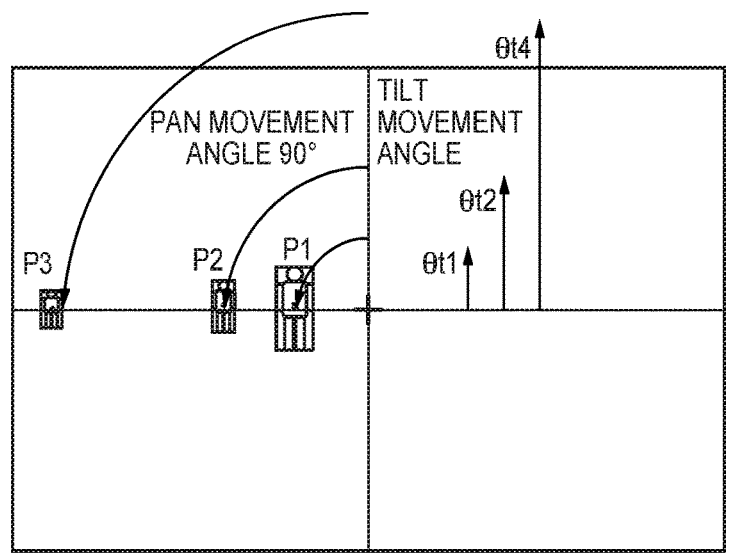

Both FIGS. 2B and 2C express sensing ranges (the sensed video) of the image sensing device in cases in which the tilt position is close to a straight down direction, and the optical axis of the image sensing lens of the image sensing device attached to the ceiling is in a vertical direction (a straight down direction). Here, to cause the image sensing direction 22 to move in upward/downward directions in the sensed video, the tilt angle is caused to change. Meanwhile, for movement in the horizontal direction in the sensed video, it is impossible to move directly by movement in the pan direction alone. In such a case, the movement in the pan direction is a rotation centered on the center of the sensed video.

As illustrated in FIG. 2B, for causing the objects T1, T2, and T3 to come to the center position of the frame, the pan movement angle is zero, and the tilt movement angles are $\theta t1$, $\theta t2$, and $\geq t3$ in the upward direction of the screen, similar to that shown in FIG. 2A. Meanwhile, as illustrated in FIG. 2C, the pan movement angle to cause the objects P1, P2, and P3 to come to the center position of the frame is ninety degrees counterclockwise when viewed from the upward direction, and the tilt movement angles are $\theta t1$, $\theta t2$, and $\theta t4$ in the upward direction of the screen. As illustrated in FIG. 2C, there is a case when the pan/tilt movement angle becomes large when the lens faces a straight down direction (the direction of the pan axis 20).

The speed when causing pan/tilt for tracking a particular object to change (the angle of change in a predetermined time) is often made to be a constant angular velocity because the sensed video becomes difficult to view during a pan/tilt movement when the speed is too fast. Thus, the moving time necessary for a pan movement becomes longer the larger the pan angle, and the moving time necessary for a tilt movement becomes longer the larger the tilt angle. During movement, it is difficult to perform a detection of an object. For this reason, the longer the moving time for pan/tilt, the more there is a possibility that the object will exit the angle of view in the meantime, or that the size on the screen will become smaller than a size that can be detected (a smallest detection size) since the object moves away from the image sensing device. As a result, the probability that the object will be lost from view after the movement increases.

Next, a size at which a specific object can be detected is explained using FIGS. 3A and 3B. The image analysis unit 110 divides the sensed video into block units of a predetermined size, and performs object detection processing in units of blocks. For example, for sensed video that is horizontally 1280 pixels×vertically 720 pixels, blocks having a size of 8 pixels×8 pixels are made to be the units to perform the object detection processing. In such a case, the sensed video has a size of horizontally 160 blocks×vertically 90 blocks.

The image analysis unit 110 calculates a difference between corresponding blocks between two frames that are temporally adjacent, and decides the tracking target based on blocks for which a differential value is greater than or equal to a predetermined value. For example, blocks that consecutively are a cluster are made to be the tracking target as differential blocks. However, in order to remove noise due to minute changes in brightness of the sensed video, minute vibrations of the mounting portion of the image sensing device, or the like, noise blocks are determined for differential blocks of a small size among the obtained differential blocks. The noise blocks are blocks that are not object detection targets, and the specific object is detected from non-noise blocks. Here, if a moving body of a size that is less than four blocks is detected, that moving body is treated as noise. In FIG. 3A, differential block appearance patterns that are treated as noise are illustrated. Combinations of the height and the width of a moving body for four appearance patterns are respectively (1, 1), (2, 1), (1, 2), and (2, 2). Also, appearance patterns of a minimum size of blocks not treated as noise are illustrated in FIG. 3B. Combinations of the height and the width of a moving body for these appearance patterns are respectively (4, 1), (1, 4), (3, 2), (2, 3) and (2, 2). For the height and width combination (2, 2), there are patterns that are treated as noise having three appearing blocks, and a pattern that is not treated as noise having four differential blocks in a cluster. To reduce the possibility that the object will be lost from view due to zooming out too much, a (2, 2) combination is assumed to be a combination that is treated as noise, and when the total of the number of blocks in a height direction and the number of blocks in a width direction is five blocks or more, that is judged to be detectable as a moving body. That is, in this example, the size that can be detected (minimum detection size) is a size for which the sum of the number of blocks in the height direction and the number of blocks in the width direction is five blocks.

As described above, in the present embodiment, the image analysis unit 110 determines that an object (a moving body) of a size smaller than a particular size (a reference size) is noise. Then, the image analysis unit 110 does not make an object that is determined to be noise a tracking target. Accordingly, a size that can be detected is a size that is defined based on the size that is the reference for determining whether not to make it a tracking target. Leaving some leeway, a size that is slightly larger than the reference size for determining noise may be made to be the later described detectable size. For example, a size that is 1.1 times the size that is the reference for determination of noise may be made to be the detectable size.

Figure 4:
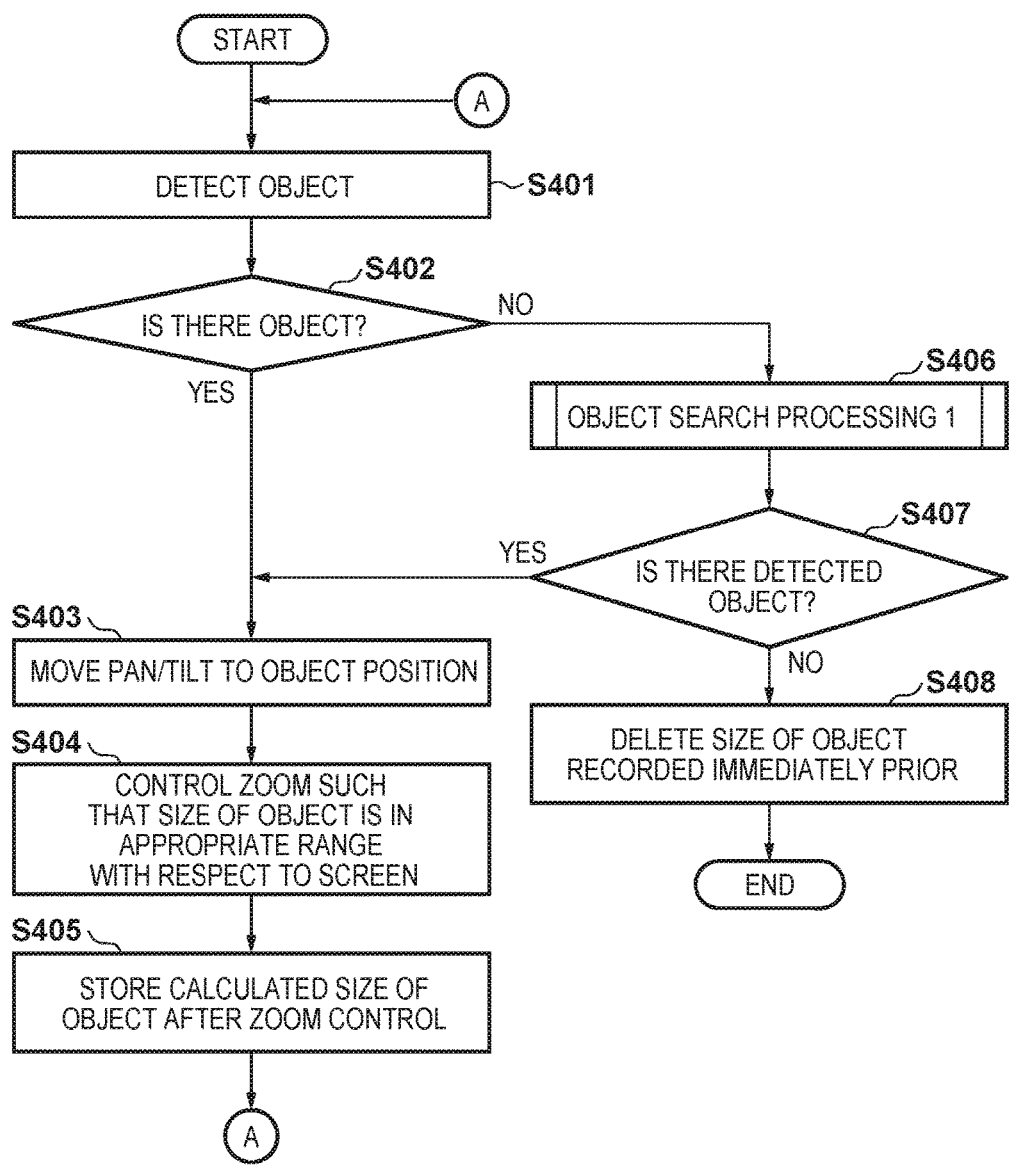
FIG. 4 is a flowchart of a tracking image sensing operation on a tracking target by the image sensing device.

Next, an explanation of a tracking image sensing operation on a tracking target by the image sensing device is given using the flowchart of FIG. 4. Note that, at the starting step of the processing in accordance with the flowchart of FIG. 4, none of the pan angle, the tilt angle, or the zoom of the image sensing device are being changed.

In step S401, the image analysis unit 110 obtains a difference between corresponding blocks between two frames that are temporally adjacent, and performs processing for detecting an object (a tracking target) that becomes the tracking target based on this difference. Then, in step S402, the image analysis unit 110 determines whether the object that becomes the tracking target is included in the sensed video. If the image analysis unit 110 detects an object that becomes the tracking target, the processing proceeds to step S403, and if the tracking target cannot be detected, the processing proceeds to step S406.

The image analysis unit 110 may make a moving body (differential blocks other than noise blocks) be the tracking target, and may make an object judged to be a specific object (for example, a person) be the tracking target. Also, the image analysis unit 110 may make a specific object that is also a moving body the tracking target. Also, the image analysis unit 110 may make a target (for example, a suspicious person) registered in advance in a recording unit (not shown in the figure) among specific objects be the tracking target. Additionally, the image analysis unit 110 may make a specific object that entered a predetermined region the tracking target.

In step S403, the system control unit 103 obtains a change amount of the pan angle and/or the tilt angle so that the tracking target appears in the center position of the frame based on a current pan angle and/or tilt angle (at least one of the pan angle and the tilt angle), and a position in the frame of the tracking target that the image analysis unit 110 detected. Then, the system control unit 103 makes an instruction to the pan operation control unit 107 and/or the tilt operation control unit 109 (at least one of the pan operation control unit 107 and the tilt operation control unit 109) so as to change the current pan angle and/or tilt angle by the obtained pan angle and/or tilt angle change amounts. With this, the pan operation control unit 107 and/or the tilt operation control unit 109 control the pan operation driving unit 106 and/or the tilt operation driving unit 108 so as to change the current pan angle and/or tilt angle by the change amount instructed from the system control unit 103.

In step S404, the system control unit 103 obtains the change amount of the zoom so that the tracking target appears at a stipulated size. For example, the system control unit 103 first determines whether or not the size of the tracking target in the sensed video is appropriate with respect to the size of the sensed video. For example, it determines whether or not the height of the tracking target (the number of pixels in a vertical direction) in relation to the height of the screen of the sensed video (vertical number of pixels) exceeds a first ratio (for example 60%), and whether or not the horizontal width of the tracking target (the number of pixels in a horizontal direction) in relation to the horizontal width of the sensed video (number of pixels in the horizontal direction) exceeds the first ratio. If the result of that is that the height of the tracking target in relation to the height of the sensed video exceeds the first ratio, or the horizontal width of the tracking target in relation to the horizontal width of the sensed video exceeds the first ratio, the system control unit 103 determines that a zoom out is necessary. Also, it determines whether or not the height of the tracking target in relation to the height of the sensed video falls below a second ratio (for example, 15%), and whether or not the horizontal width of the tracking target in relation to the horizontal width of the sensed video falls below the second ratio. If the result of that is that the height of the tracking target in relation to the height of the sensed video falls below the second ratio, or the horizontal width of the tracking target in relation to the horizontal width of the sensed video falls below the second ratio, the system control unit 103 determines that a zoom in is necessary.

Also, the system control unit 103 instructs the lens control unit 105 so as to change the current zoom of the image sensing device by the obtained zoom change amount. The lens control unit 105 controls the lens driving unit 104 to perform the zoom control by the change amount instructed from the system control unit 103.

In step S405, the system control unit 103 obtains the size of the tracking target detected in step S401, the zoom in or zoom out ratio (zoom ratio) in step S404, and a size of the tracking target in the sensed video after the zoom control. For example, if it is assumed that a zoom in is performed in step S404, and the zoom in is a magnification of 1.4 times, the height of the tracking target in the sensed video after the zoom in becomes 21% of the height of the sensed video if the height of the tracking target prior to the zoom in is 15% of the height of the sensed video. Also, assume that, in step S404, a zoom out is performed, and that zoom out magnifies the angle of view by 150% vertically/horizontally. Here, if the height of the tracking target prior to the zoom out is 60% of the height of the sensed video, the height of the tracking target in the sensed video after the zoom out becomes 40% of the height of the sensed video.

Also, the system control unit 103 records the size of the tracking target in the sensed video after the zoom control, which is obtained in this way, in memory that the system control unit 103 has or external memory (not shown).

Figure 5:
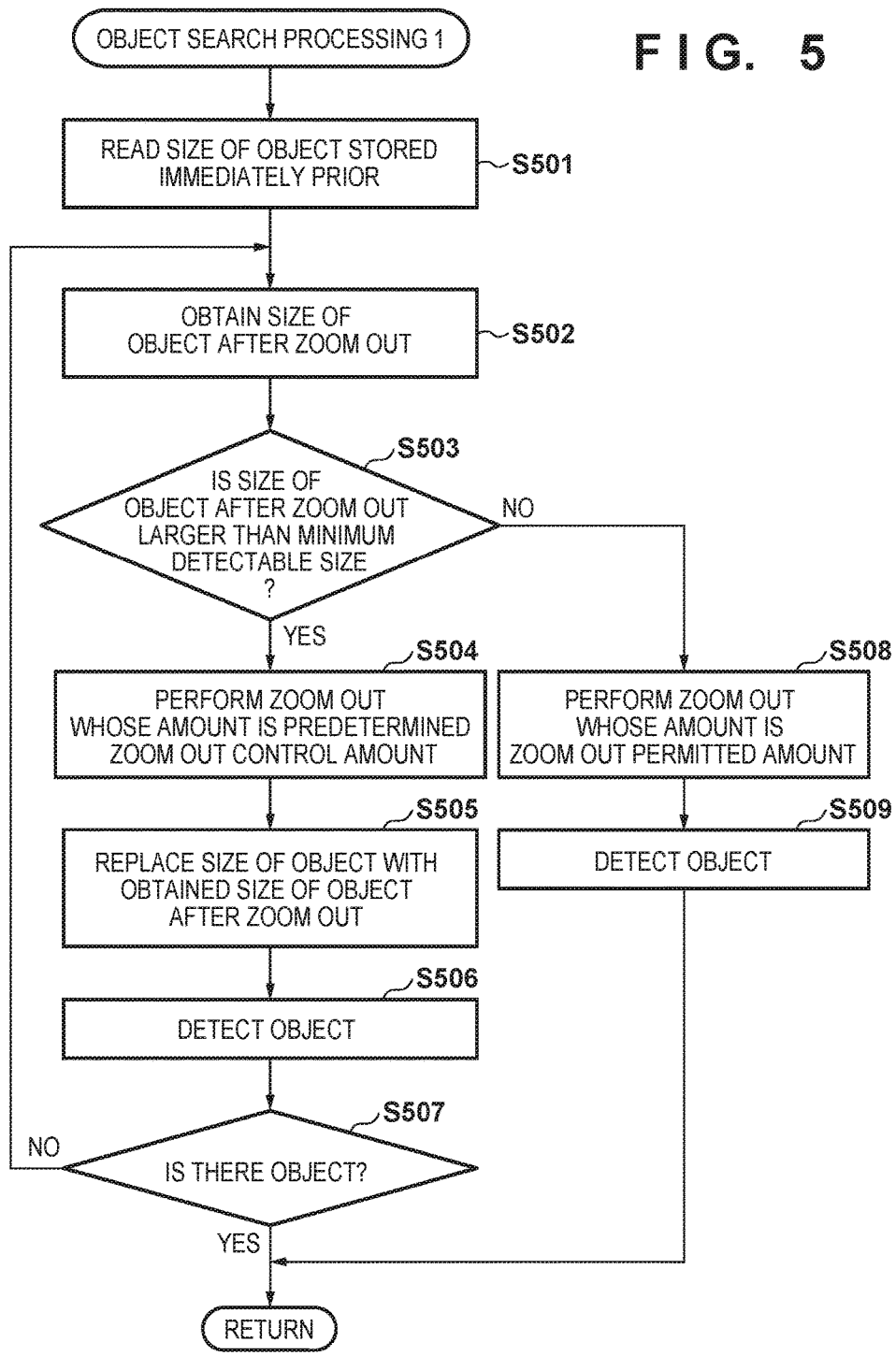
FIG. 5 is a flowchart for illustrating details of processing in step S406.

Meanwhile, in step S406, if, from a state in which the tracking target is detected, a state in which it is not detected is entered, processing for searching for the tracking target lost from view (object search processing 1) is performed. Details of the processing in step S406 is explained using the flowchart of FIG. 5.

In step S501, the image analysis unit 110 reads the size recorded in the memory in step S405, in other words, the size of the tracking target on the sensed video prior to the tracking target being lost from view (for example, immediately prior).

In step S502, the image analysis unit 110 performs the following processing. Specifically, it obtains the size to which the tracking target, which hypothetically would have the tracking target size read in step S501 if it did appear in the sensed video of the current frame, would be reduced in the sensed video if a further zoom out were performed from this state. For example, if it is assumed that the size of the tracking target that is read is vertically H pixels×horizontally W pixels, the tracking target size if expressed in the foregoing units of blocks would be vertically H/8 blocks× horizontally W/8 blocks. Here, if the angle of view at which sensing is performed in a single zoom out spreads 3/2 times vertically/horizontally, then the size of the tracking target after the zoom out would become vertically H/12 blocks× horizontally W/12 blocks in the aforementioned units of blocks. Assuming H=32 and W=64, the size of the tracking target after the zoom out becomes vertically 8/3 blocks× horizontally 16/3 blocks.

In step S503, the image analysis unit 110 performs a large/small comparison of the size in units of blocks of the tracking target obtained in step S502, and the detectable size (a predetermined size). If the result of this large/small comparison is that the size in units of blocks of the tracking target obtained in step S502 is larger than the detectable size, the processing proceeds to step S504. Meanwhile, if the size in units of blocks of the tracking target obtained in step S502 is less than or equal to the detectable size, the processing proceeds to step S508.

In the foregoing example, the processing proceeds to step S504 because the size in units of blocks of the tracking target obtained in step S502 is vertically 8/3 blocks+horizontally 16/3 blocks=8 blocks, and the detectable size=5.

In step S504, the system control unit 103 controls the lens control unit 105 to cause the lens driving unit 104 to perform a zoom out. The amount of zoom out here is a zoom out amount used to calculate the size of the tracking target in step S502 (in the foregoing example, it is a zoom out amount such that the angle of view becomes 3/2 times vertically/horizontally).

In step S505, the image analysis unit 110 deletes the tracking target size recorded in the memory in step S405, and, in its place, records in the memory the size of the tracking target obtained in step S502 (the most recently obtained tracking target size). This recorded size may be the size described above, in units of blocks, and may be a size expressed in a number of pixels vertically/horizontally.

In step S506, the image analysis unit 110 performs processing for detecting the tracking target from the sensed video generated by the image processing unit 102 by the same processing as in the foregoing step S401. This sensed video is the sensed video after the zoom out performed in the foregoing step S504. If the tracking target appears in the sensed video after the zoom out, the size of the tracking target in this sensed video becomes larger than the detectable size at least. Accordingly, it is considered that the problem that the tracking target cannot be detected due to a problem of the size of the tracking target in the sensed video after the zoom out will not arise.

In step S507, the image analysis unit 110 determines whether it was possible to detect the tracking target object, and if the image analysis unit 110 could detect the tracking target from the sensed video, the processing proceeds to step S407. Meanwhile, if, in step S506, the image analysis unit 110 could not detect the tracking target from the sensed video, the processing proceeds to step S502, and the following processing is performed using the size of the tracking target recorded in the memory in step S505. Here, in step S502, instead of "the tracking target size read in step S501", "the size of the tracking target recorded in the memory in step S505" is used. This "size of the tracking target recorded in the memory in step S505" is treated as the size of the tracking target obtained the previous time in step S502.

That is, the image analysis unit 110 obtains a predicted size of the tracking target in the sensed video after the further zoom out based on the predicted size obtained the previous time, if the result of the search in relation to the sensed video after the zoom out is that the tracking target cannot be detected in that sensed video. Then, if the predicted size of the tracking target in the sensed video, after the further zoom out is larger than a predetermined size, a zoom out is performed, and the tracking target is searched for in the sensed video after that zoom out.

Meanwhile, in step S508, the system control unit 103 controls the lens control unit 105 to cause the lens driving unit 104 to perform one time's worth of a zoom out. The zoom out amount here is a zoom out amount such that the size in units of blocks of the tracking target obtained in step S502≈the detectable size.

In step S509, the image analysis unit 110 performs processing for detecting the tracking target from the sensed video generated by the image processing unit 102 by the same processing as in the foregoing step S401. This sensed video is the sensed video after the zoom out performed in the foregoing step S508.

Returning to FIG. 4, if, in step S407, the image analysis unit 110 determines that the tracking target can be detected from the sensed video, the processing proceeds to step S403. Meanwhile, if the image analysis unit 110 cannot detect the tracking target from the sensed video, the processing proceeds to step S408. In step S408, the system control unit 103 deletes the size of the tracking target recorded in the memory.

As described above, the system control unit 103 and the image analysis unit 110 cooperate to function as a search unit.

In this way, by virtue of the present embodiment, when an object is lost from view during tracking, the size (the predicted size) of the tracking target in the case of zooming out, which is calculated based on the size of the object stored immediately prior, and the smallest size at which a moving body can be detected are compared, and by determining whether to zoom out in accordance with the comparison result, it is possible to prevent not being able to detect the object due to zooming out too much.

Second Embodiment

In the present embodiment, if the change amounts for the pan angle/tilt angle prior to the tracking target being lost from view (for example, immediately prior) are larger than a stipulated amount, similar to the first embodiment, a zoom out is executed to search for the tracking target that is lost from view.

Then, if the change amounts of the pan angle/tilt angle prior to the tracking target being lost from view (for example, immediately prior) are less than or equal to the stipulated amount, a zoom out is not executed to search for the tracking target that is lost from view. By configuring in this way, it is possible to prevent performing unnecessary zoom out processing in cases when it is predicted that, rather than the tracking target becoming outside of the screen, it becomes smaller than the detectable size on the screen, or when the tracking target stops. Hereafter, predominantly, differences from the first embodiment are explained, and matters that are not particularly mentioned below are assumed to be the same as those in the first embodiment.

An explanation of a tracking image sensing operation on a tracking target by the image sensing device is given using the flowchart of FIG. 6. Note that, in FIG. 6, steps that are the same as processing steps illustrated in FIG. 4 are given the same step numerals, and an explanation related to these steps is omitted.

In step S604, the system control unit 103 records, in a memory, change amounts for the pan angle and/or the tilt angle obtained in step S403. In step S607, the system control unit 103 reads the change amounts for the pan angle and/or the tilt angle recorded in the memory in step S604. Here, the pan/tilt may actually be caused to change.

In step S608, the system control unit 103 determines whether or not the change amounts for the pan angle and/or the tilt angle read out in step S607 are larger than a stipulated amount. If the result of this determination is that the change amounts of the pan angle and/or the tilt angle read in step S607 are larger than the stipulated amount, the processing proceeds to step S406. In such a case, because the movement of the tracking target is predicted to be fast, the possibility that the tracking target became outside of the screen is high.

Meanwhile, if the change amounts of the pan angle and/or the tilt angle read in step S607 are less than or equal to the stipulated amount, the processing proceeds to step S401. In such a case, because it is predicted that the movement of the tracking target is slow, the possibility that the tracking target did not become outside of the screen, but rather, became smaller than the detectable size in the screen is high. For example, if the change amount of the pan angle or the tilt angle is an amount corresponding to ¼ or more of the width of the angle of view of the sensed video (the size of the angle of view in the horizontal direction), the processing proceeds to step S406, and if it is an amount corresponding to less than ¼ of the angle of view of the width of the sensed video, the processing proceeds to step S401.

In step S611, the system control unit 103 deletes the size of the tracking target recorded in the memory, and the change amount of the pan angle and/or the tilt angle recorded in the memory in step S604.

In this way, by performing a zoom out operation when the change amount of the pan angle and/or the tilt angle stored immediately prior is large, in accordance with the present embodiment, it is possible to reduce the number of times that unnecessary zoom out processing is performed when the tracking target is lost from view during the tracking. Specifically, a zoom out is not executed to search for the tracking target that is lost from view if the change amounts of the pan angle/tilt angle prior to the tracking target being lost from view (for example, immediately prior) are less than or equal to the stipulated amount, and thereby, it is possible to reduce the number of times that unnecessary zoom out processing is performed.

Third Embodiment

In the present embodiment, in addition to the second embodiment, if the change amount of the pan angle/tilt angle immediately prior to the tracking target being lost from view is less than a second stipulated amount, a zoom in is executed in order to search for the tracking target that is lost from view. Hereafter, predominantly, differences from the second embodiment are explained, and unless particularly touched upon below, it is assumed to be the same as in the second embodiment.

Figure 7:
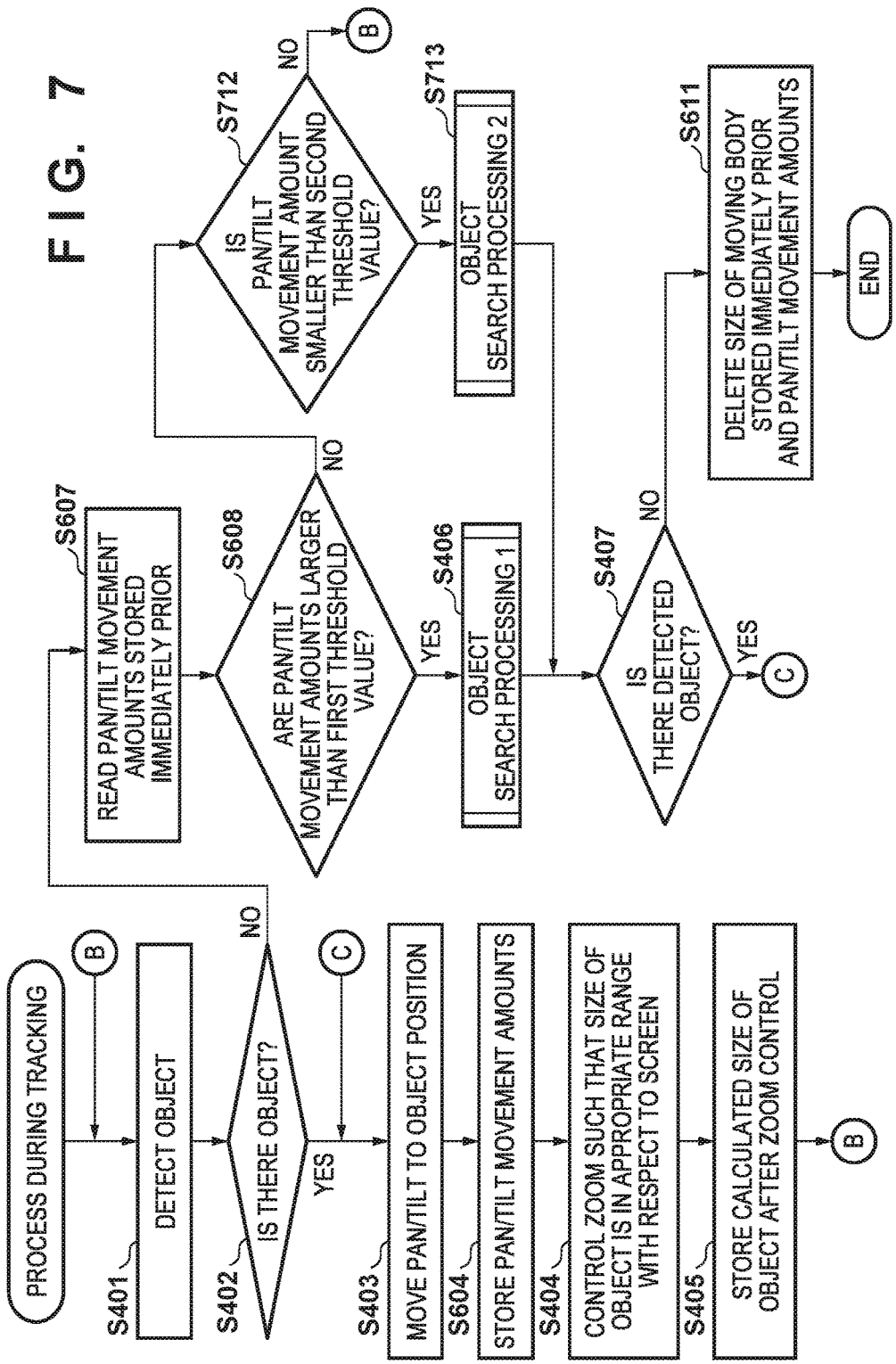
FIG. 7 is a flowchart of a tracking image sensing operation on a tracking target by the image sensing device.

Next, an explanation of a tracking image sensing operation on a tracking target by the image sensing device is given using the flowchart of FIG. 7. Note that, in FIG. 7, steps that are the same as processing steps illustrated in FIGS. 4 and 6 are given the same step numerals, and an explanation related to these processing steps is omitted.

Note that, in step S608 of FIG. 7, only the point that what is referred to as "the stipulated amount" in the second embodiment is referred to as "a first threshold value" differs from step S608 of the second embodiment, and the substantial processing is the same as the processing of step S608 explained in the second embodiment. If, in step S608, the change amount of the pan angle and/or the tilt angle read in step S607 is less than or equal to the first threshold value, the processing proceeds to step S712.

In step S712, the system control unit 103 determines whether or not the change amount of the pan angle and/or the tilt angle read in step S607 is less than a second threshold value. Note that the second threshold value is less than the first threshold value. If the result of this determination is that the change amounts of the pan angle and/or the tilt angle read in step S607 are smaller than the second threshold value, the processing proceeds to step S713. Meanwhile, if the change amounts of the pan angle and/or the tilt angle read in step S607 are greater than or equal to the second threshold value, the processing proceeds to step S401. For example, the processing proceeds to step S713 if the condition that the change amount of the pan angle is less than or equal to ⅛ (the second threshold value) of the angle of view of the width of the sensed video, and the change amount of the tilt angle is less than or equal to ⅛ (the second threshold value) of the angle of view in a direction of the sensed video height is satisfied. Meanwhile, if this condition is not satisfied, the processing proceeds to step S401.

When the result of the determination of step S712 is that the pan angle and/or tilt angle change amounts read in step S607 are less than the second threshold value, there is the possibility that the tracking target is moving at a low speed. When an object is detected by a difference between frames, there is the possibility that an object that is moving slowly in this way, or that is stopped, will not be detected, even though the object appears in the screen. Accordingly, a zoom in is not performed. In this way, it is possible to avoid performing an unnecessary zoom in. If zooming in is performed too much, there is a possibility that the apparent moving speed of an object in the screen will become too fast, and the apparent size of the object will become large and protrude from the screen. By preventing unnecessary zooming in, it is possible to enhance detection accuracy.

Figure 8:
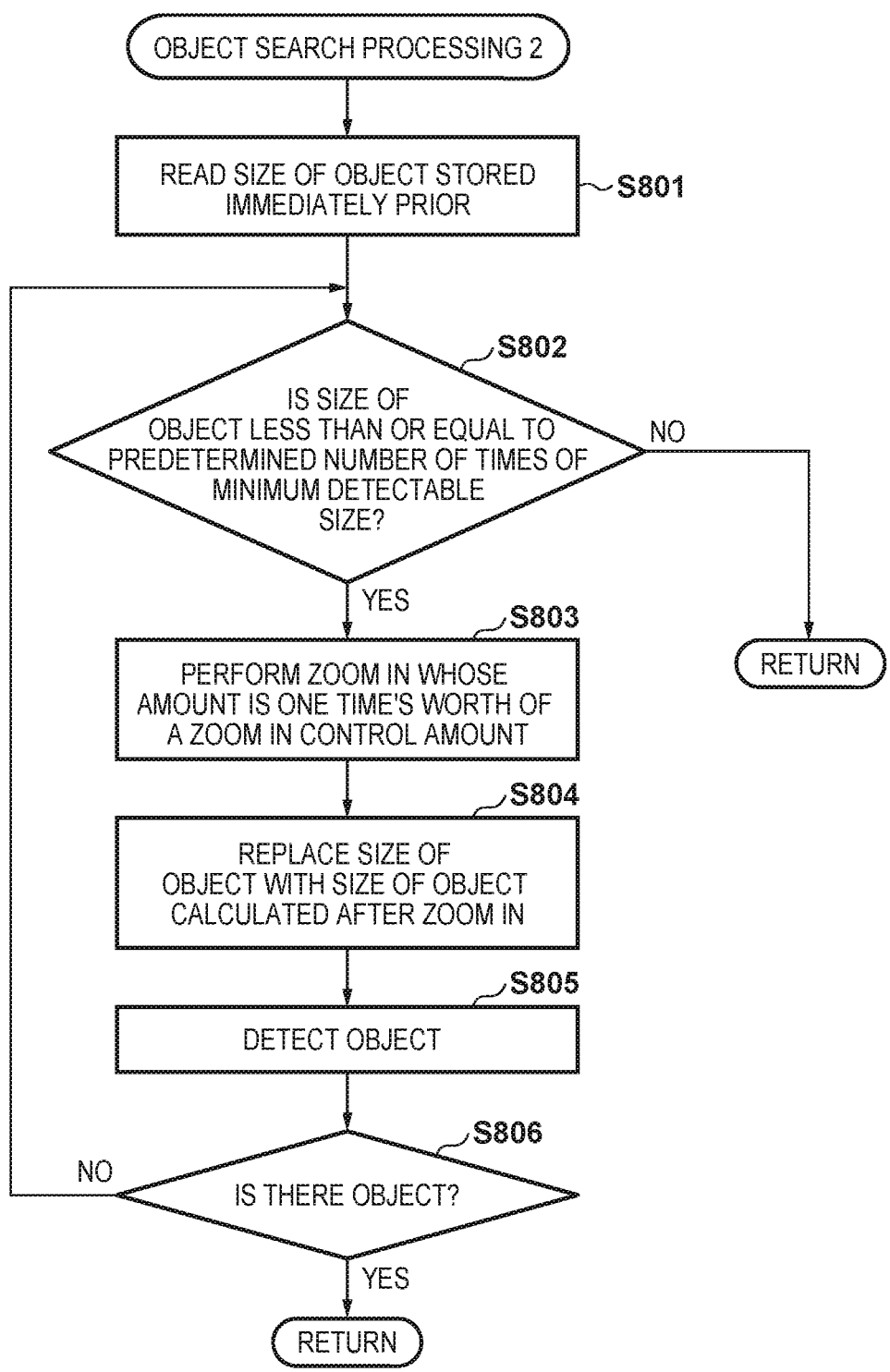
FIG. 8 is a flowchart for illustrating details of processing in step S713.

In step S713, processing for searching for a tracking target that is lost from view (object search processing 2) is performed. Details of the processing in step S713 is explained using the flowchart of FIG. 8.

In step S801, the image analysis unit 110 reads the size recorded in the memory in step S405, in other words, the size of the tracking target on the sensed video prior to the tracking target being lost from view (for example, immediately prior).

In step S802, the image analysis unit 110, if the size of the tracking target read in step S801 is expressed the foregoing units of blocks, first obtains a number of blocks (A×B) corresponding to the size of the tracking target, assuming vertically A blocks×and horizontally B blocks. Then, the system control unit 103 determines whether or not the obtained number of blocks is less than or equal to a constant number of times of the detectable size. For example, similar to the first embodiment, the detectable size is assumed to be "5", and assuming that the constant is "2", it is determined whether or not the obtained number of blocks is less than or equal to 5×2=10.

If the result of this determination is that the obtained number of blocks is less than or equal to the constant number of times the detectable size, the processing proceeds to step S803, and if the obtained number of blocks is greater than the constant number of times the detectable size, the processing proceeds to step S407.

Meanwhile, in step S803, the system control unit 103 controls the lens control unit 105 to cause the lens driving unit 104 to perform one time's worth of a zoom in.

In step S804, the image analysis unit 110 obtains the size of the tracking target in the sensed video after the zoom in. If the number of blocks corresponding to the tracking target size obtained in step S802 is assumed to be N, and the amount of the zoom in performed in step S803 is assumed to be M, (N×M) is obtained as the size of the tracking target in the sensed video after the zoom in. Then, the image analysis unit 110 deletes the tracking target size recorded in the memory in step S405, and in its place, records in the memory the size of the tracking target obtained in this step.

In step S805, the image analysis unit 110 performs processing for detecting the tracking target from the sensed video generated by the image processing unit 102 by the same processing as in the foregoing step S401. This sensed video is the sensed video after the zoom in performed in the foregoing step S803.

If, in step S805, the image analysis unit 110 can detect the tracking target in the sensed video, the processing proceeds to step S407 via step S806. Meanwhile, if, in step S805, the image analysis unit 110 cannot detect the tracking target in the sensed video, the processing proceeds to step S802 via step S806, and the following processing is performed using the size of the tracking target recorded in the memory in step S804.

In this way, by virtue of the present embodiment, when the tracking target is lost from view during the tracking, it is possible to find and to track the tracking target that became far away from the image sensing device by performing a zoom in operation when the change amount of the pan angle and/or the tilt angle stored immediately prior is small.

Fourth Embodiment

All of the functional units illustrated in FIG. 1 may be configured by hardware, but part of the system control unit 103 may also be implemented by software (a computer program). Also, the image processing unit 102, the image analysis unit 110, the lens control unit 105, the pan operation control unit 107, and the tilt operation control unit 109, in each embodiment, may be realized by a processor and a memory. The foregoing configurations may be realized by one processor and one memory, or may be realized by a plurality of processors and a plurality of memories.

Figure 9:
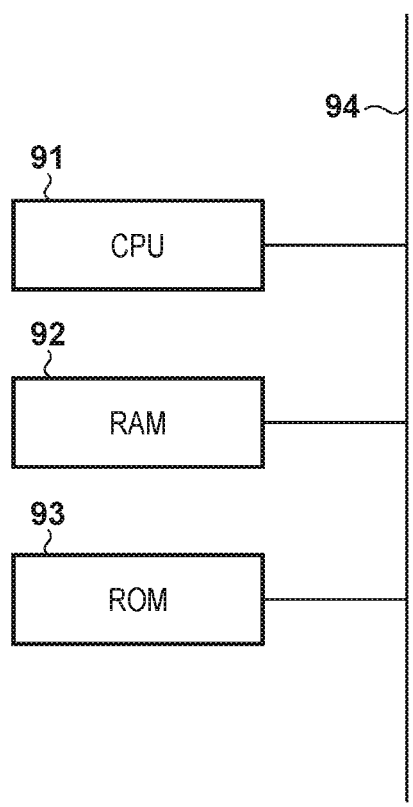
FIG. 9 is a block diagram for illustrating a hardware configuration of a control apparatus.

Here, using FIG. 9, an explanation is given of an example of a hardware configuration of a computer of the image sensing device in a case when the foregoing configurations are realized by a processor and a memory. An example using a CPU as a processor, and using a RAM as a memory is given as an example.

A CPU 91, in addition to performing control of the entirety of the computer using computer programs and data stored in a RAM 92 and a ROM 93, executes processing that the units described above execute.

The RAM 92 has an area for storing computer programs, data, and the like, temporarily. Furthermore, the RAM 92 has a work area used when the CPU 91 executes each process. That is, the RAM 92 functions as a frame memory, for example, and functions as various other kinds of recording areas.

In the ROM 93, setting data of the computer, a boot program, and the like, is stored. Reference numeral 94 denotes a bus that connects each of the foregoing units.

Also, all or some of the embodiments explained above may combined as appropriate.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus that controls an image sensing device for tracking and sensing a tracking target, the apparatus comprising:
   at least one processor operatively coupled to a memory, serving as:
   (a) a detection unit configured to detect a tracking target that appears in a sensed video sensed by the image sensing device;
   (b) a recording unit configured to record a size of the tracking target that appears in the sensed video;
   (c) a determination unit configured, when a state in which the tracking target is detected in the sensed video becomes a state in which the tracking target is not detected in the sensed video, to determine a predicted size of the tracking target in the sensed video, based on the size recorded by the recording unit, for a case of zooming out at a predetermined scaling factor; and (d) a search unit configured to zoom out by the predetermined scaling factor, if the predicted size is larger than a predetermined size, and then to search for the tracking target in the sensed video after the zoom out.

2. The control apparatus according to claim 1, wherein the determination unit determines the predicted size of the tracking target in the sensed video after a further zoom out, based on the previously obtained predicted size, if a result of the search, in relation to the sensed video after the zoom out at the predetermined scaling factor, is that the tracking target cannot be detected from the sensed video, and the search unit zooms out if the predicted size of the tracking target in the sensed video after the further zoom out is larger than a predetermined size, and then searches for the tracking target in the sensed video after the zoom out.

3. The control apparatus according to claim 1, wherein the search unit does not make an object that is smaller than a reference size be a tracking target, and wherein the predetermined size is a size based on the reference size.

4. The control apparatus according to claim 1, wherein the recording unit records the size of the tracking target that appears in a sensed video that is sensed after controlling a zoom, so that the tracking target appears at a predetermined size in the sensed video.

5. The control apparatus according to claim 1, wherein the determination unit, if a tracking target cannot be detected from the sensed video and if a change amount of at least one of a pan angle and a tilt angle of the image sensing device immediately prior is greater than a predetermined amount, determines a predicted size of a tracking target in a sensed video after a zoom out based on the size recorded by the recording unit, and the search unit zooms out if the predicted size is larger than a predetermined size, and then searches for the tracking target in the sensed video after the zoom out.

6. The control apparatus according to claim 1, wherein the search unit, if a tracking target cannot be detected from the sensed video and if a change amount of at least one of a pan angle and a tilt angle of the image sensing device immediately prior is less than a predetermined amount, zooms in when the size of the tracking target in the sensed video is smaller than a predetermined size, and then searches for the tracking target in the sensed video after the zoom in.

7. A method of controlling an image sensing device for tracking and sensing a tracking target, by a processor executing a program stored in a memory, the method comprising:
  detecting a tracking target that appears in a sensed video sensed by the image sensing device;
  recording a size of the tracking target that appears in the sensed video;
  determining a predicted size of the tracking target in the sensed video, based on the recorded size, for a case of zooming out at a predetermined scaling factor, when a state in which the tracking target is detected in the sensed video becomes a state in which the tracking target is not detected in the sensed video; and
  zooming out by the predetermined scaling factor, if the predicted size is larger than a predetermined size, and then searching for the tracking target in the sensed video after the zoom out.

8. The method according to claim 7, wherein the determining determines the predicted size of the tracking target in the sensed video after a further zoom out, based on the previously obtained predicted size, if a result of the search, in relation to the sensed video after the zoom out at the predetermined scaling factor, is that the tracking target cannot be detected from the sensed video, and the searching zooms out if the predicted size of the tracking target in the sensed video after the further zoom out is larger than a predetermined size, and then searches for the tracking target in the sensed video after the zoom out.

9. The method according to claim 7, wherein the searching does not make an object that is smaller than a reference size be a tracking target, and wherein the predetermined size is a size based on the reference size.

10. The method according to claim 7, wherein the recording records the size of the tracking target that appears in a sensed video that is sensed after controlling a zoom, so that the tracking target appears at a predetermined size in the sensed video.

11. The method according to claim 7, wherein the determining, if a tracking target cannot be detected from the sensed video and if a change amount of at least one of a pan angle and a tilt angle of the image sensing device immediately prior is greater than a predetermined amount, determines a predicted size of a tracking target in a sensed video after a zoom out based on the size recorded by the recording, and the searching zooms out if the predicted size is larger than a predetermined size, and then searches for the tracking target in the sensed video after the zoom out.

12. The method according to claim 7, wherein the searching, if a tracking target cannot be detected from the sensed video and if a change amount of at least one of a pan angle and a tilt angle of the image sensing device immediately prior is less than a predetermined amount, zooms in when the size of the tracking target in the sensed video is smaller than a predetermined size, and then searches for the tracking target in the sensed video after the zoom in.

13. A non-transitory computer-readable storage medium that stores a program for causing a computer of a control apparatus that controls an image sensing device for tracking and sensing a tracking target to function as:
  (a) a detection unit configured to detect a tracking target that appears in a sensed video sensed by the image sensing device;
  (b) a recording unit configured to record a size of the tracking target that appears in the sensed video; and
  (c) a determining unit configured, when a state in which the tracking target is detected in the sensed video becomes, a state in which the tracking target is not detected in the sensed video, to determine a predicted size of the tracking target in the sensed video, based on the size recorded by the recording unit, for a case of zooming out at a predetermined scaling factor; and
  (d) search unit configured to zoom out by the predetermined scaling factor, if the predicted size is larger than a predetermined size, and then to search for the tracking target in the sensed video after the zoom out.

14. The storage medium according to claim 13, wherein the determination unit determines the predicted size of the tracking target in the sensed video after a further zoom out, based on the previously obtained predicted size, if a result of the search, in relation to the sensed video after the zoom out at the predetermined scaling factor, is that the tracking target cannot be detected from the sensed video, and the search unit zooms out if the predicted size of the tracking target in the sensed video after the further zoom out is larger than a predetermined size, and then searches for the tracking target in the sensed video after the zoom out.

15. The storage medium according to claim 13, wherein the search unit does not make an object that is smaller than a reference size be a tracking target, and wherein the predetermined size is a size based on the reference size.

16. The storage medium according to claim 13, wherein the recording unit records the size of the tracking target that appears in a sensed video that is sensed after controlling a zoom, so that the tracking target appears at a predetermined size in the sensed video.

17. The storage medium according to claim 13, wherein the determination unit, if a tracking target cannot be detected from the sensed video and if a change amount of at least one of a pan angle and a tilt angle of the image sensing device immediately prior is greater than a predetermined amount, determines a predicted size of a tracking target in a sensed video after a zoom out based on the size recorded by the recording unit, and the search unit zooms out if the predicted size is larger than a predetermined size, and then searches for the tracking target in the sensed video after the zoom out.

18. The storage medium according to claim 13, wherein the search unit, if a tracking target cannot be detected from the sensed video and if a change amount of at least one of a pan angle and a tilt angle of the image sensing device immediately prior is less than a predetermined amount, zooms in when the size of the tracking target in the sensed video is smaller than a predetermined size, and then searches for the tracking target in the sensed video after the zoom in.

* * * * *